(12) United States Patent
Deeds

(10) Patent No.: US 7,259,673 B2
(45) Date of Patent: Aug. 21, 2007

(54) ANTI-THEFT ARRANGEMENT, METHOD AND PROGRAM

(75) Inventor: Douglas Deeds, Bedford, TX (US)

(73) Assignee: Nokia Corporation, Espoo (FI)

(*) Notice: Subject to any disclaimer, the term of this patent is extended or adjusted under 35 U.S.C. 154(b) by 137 days.

(21) Appl. No.: 10/996,800

(22) Filed: Nov. 24, 2004

(65) Prior Publication Data
US 2006/0109122 A1    May 25, 2006

(51) Int. Cl.
*G08B 13/14* (2006.01)
(52) U.S. Cl. .................. 340/572.1; 340/572.3; 340/572.4; 340/571; 340/568.1; 705/28
(58) Field of Classification Search ........... 340/572.1, 340/572.3, 572.4, 571, 568.1, 568, 539; 235/384, 235/348, 345; 705/28
See application file for complete search history.

(56) References Cited

U.S. PATENT DOCUMENTS 6,232,877 B1 * 5/2001 Ashwin ............... 340/572.1
6,480,699 B1 * 11/2002 Lovoi ..................... 455/41.2
7,015,790 B1 * 3/2006 Schrott et al. ........... 340/5.2
2005/0061870 A1 * 3/2005 Stockton ................ 235/380

FOREIGN PATENT DOCUMENTS

EP       0827123       3/1998
WO    2004/034347    4/2004

* cited by examiner

Primary Examiner—Jeffery Hofsass
Assistant Examiner—Hongmin Fan

(57) ABSTRACT

The present invention relates to the field of security and especially to radio frequency identification. According to an embodiment method for securing a personal item for preventing unauthorized passage out of secured premises comprises steps of checking tag for identifying a personal item exiting the premises, checking a permission bits of the identified tag, and determining according to the permission bits of the tag is the item allowed to leave premises secured by the security system.

22 Claims, 2 Drawing Sheets

ANTI-THEFT ARRANGEMENT, METHOD AND PROGRAM

TECHNICAL FIELD

The present invention relates to field of security and especially to radio frequency identification.

BACKGROUND OF THE INVENTION

Radio frequency identification (RFID) is a technology used for unique identification of a target, e.g. an object, animal, or person. RFID technology incorporates the use of electromagnetic or electrostatic coupling in the radio frequency portion of the electromagnetic spectrum. Radio frequency identification is coming into increasing use in industry as an alternative to the commonly used bar code. Bar codes require direct contact or line-of-sight when scanning, whereas the radio frequency identification can be verified without direct contact.

An RFID system comprises three components: an antenna and a transceiver, and a transponder. The antenna uses radio frequency waves to transmit a signal that activates the transponder. When activated the transponder transmits data back to the antenna. The received data is typically used to notify a programmable logic controller that an action should occur. The action could be as simple as raising an access gate. On the other hand the action could be as complicated as interfacing with a database to carry out a monetary transaction. RFID systems use so called active transponders, which transmit a coded signal when it receives a request from a monitoring or control point. The transponder output signal is tracked, so the position of the transponder can be constantly monitored. The input and output frequencies are pre-assigned.

RFID systems use different frequencies. Low-frequency RFID systems use the frequency range from 30 KHz to 50 KHz and have rather short transmission ranges, generally less than six feet. High-frequency RFID systems use the frequency range from 850 MHz to 950 MHz, and from 2.4 GHz to 2.5 GHz. The transmission range of high-frequency RFID can exceed 90 feet.

SUMMARY OF THE INVENTION

The objective of the present invention is to diversify the use of the RFID system. Another objective of the present invention is to enhance security in controlled premises.

The objective is achieved so that the RFID system is used for securing personal items so that an RFID tag is allocated for a personal item to be secured.

According to an embodiment a security system for securing items within premises, comprises a transceiver for sending a signal in order to form a radio frequency (RF) field, a tag fixed to an item to be secured and chargeable by the RF field formed by the transceiver for sending to the transceiver data identifying the item having the tag fixed in it, means for checking a personal identifier related to the identified tag, means for checking according to the identified tag and personal identifier, is the identified tag associated to the personal identifier, and according to possibly found association, allowed to leave premises secured by the security system. In a method according to an embodiment of the present invention individuals can make secondary use of existing company security systems and protect their own personal property by utilizing the RFID technology and a personal security system.

The personal security is typically used for identifying persons carrying certain tags, or to be exact, items to which the certain tags are fixed. According to an embodiment the tag is fixed to the item in a manufacturing phase. According to another embodiment the tag is allocated among tags controlled by an employer. Certain tags can be allocated to a certain employee. The employee controls the tags allocated to him, i.e. the employee can activate or deactivate the tag attached to a personal item to be secured. When the employee intends to leave the premises, he deactivates the tag attached to his personal item he intends to carry out with him. The deactivation is typically done by setting a bit of a tag attached to the personal item in question. When leaving the secured premises, the RFID reader checks whether the tag has permission to leave or not. This embodiment has an advantage that no extra equipment is needed. The user may control tags allocated to him and attached to his personal item(s) using their personal computer, terminal or a mobile device. Another advantage is that permission is stored in bits of a tag, thus no storage means for permissions is needed.

According to another embodiment the tag is allocated for use of a certain person or employee having a personal identifier. Persons can be identified e.g. by their badges or access control cards, or like identifiers. According to an embodiment a security system comprises means for requesting the personal identifier from the user. The user can input the identifier manually or automatically e.g. by showing his identifying card to a reader, which will read the information and identify the person accordingly. According to an embodiment the personal identifying card is read remotely. The remote reading for identifying the person carrying a certain tag can be implemented with aid of the same security system used for securing premises and checking tags fixed to items. According to another embodiment remote reading is implemented with aid of a specific personal identifying system.

A transceiver according to an embodiment for securing premises, comprises means for sending a signal in order to form a radio frequency (RF) field, means for receiving data from a RFID tag for identifying the tag as a response to the tag charged by the RF-field, means for checking a personal identifier related to the identified tag, and means for checking according to the identified tag and personal identifier, is the identified tag associated to the personal identifier, and according to possibly found association, allowed to leave premises secured by the security system. According to an embodiment the transceiver of the used RFID security system also has means for remotely reading the personal identifier. According to an embodiment the transceiver also has executable means for performing checks. Typically there are checks performed about a tag identifying an item, a personal identifier identifying a person carrying an item having a tag, and associations predetermined between those two identifiers. For performing checks, the transceiver typically also has means for storing identifiers and data associated to them, or means for accessing a storage device storing such information.

According to an embodiment a method for securing premises with a security system, comprises steps of sending a signal by a transceiver in order to form a radio frequency (RF) field, sending data to the transceiver by a tag fixable to an item to be secured and chargeable by the RF-field formed by the transceiver, identifying the tag by the data sent by the tag as a response to the tag arriving in a coverage area of the RF-field, checking whether a personal identifier is related to the identified tag, identifying the personal identifier associated to the identified tag, checking according to the identified tag and personal identifier, is the identified tag associated to the personal identifier, and according to a possibly found association, allowed to leave premises secured by the security system.

Use of a security system for securing a personal item, comprises steps of identifying a tag fixed to the personal item so that data is sent to a transceiver of a security system by the tag fixed to the personal item as a response to the tag arriving in the coverage area of, and thus charged by, a radio frequency (RF) field formed by the transceiver, identifying the person detected by carrying the personal item in question by a personal identifier of a personal identifying system, checking according to the identified tag and personal identifier, is the identified tag associated to the personal identifier, and according to a possibly found association, allowed to leave premises secured by the security system.

According to an embodiment of the present invention method for securing a personal item for preventing unauthorized passage out of secured premises comprises steps of checking a tag for identifying a personal item passing the premises, checking a personal identifier for identifying the person passing with the personal item identified, checking whether there is a predetermined association between the identified tag and the personal identifier, and allowing the passage out of secured premises only, if the association is found to exist.

Embodiments of the invention allow employees to control the security of their own items without intruding on the corporate security. Inside the working area, i.e. in the employer's premises, the employees can utilize the current RFID security system for securing their personal items. The employees can determine which tags, attached to their personal items, belong to them. Typically this determination is implemented by associating a personal identifier with a tag in question.

Businesses and companies currently protect against theft by attaching RFID tags or some other marker that can be read or scanned at entry and exit points of the premises. An attempt to remove any item with a tag causes an alarm at the entry or exit point. The system inherently assumes that any RFID tag is to be protected and not removed from the premises. According to embodiments of the present invention companies and individuals can protect their own property using RFID tags, RFID readers and personal identifiers associated to the read tags, to ensure that a person has right to take the item in question with him outside the protected premises. So personal items need not be locked up inside the secured premises, but can be secured to not leave the area. This forms kind of secondary use of the currently available company security systems for protecting personal property.

BRIEF DESCRIPTION OF DRAWINGS

In the following embodiments of the present invention are discussed in detail with the accompanying figures, in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
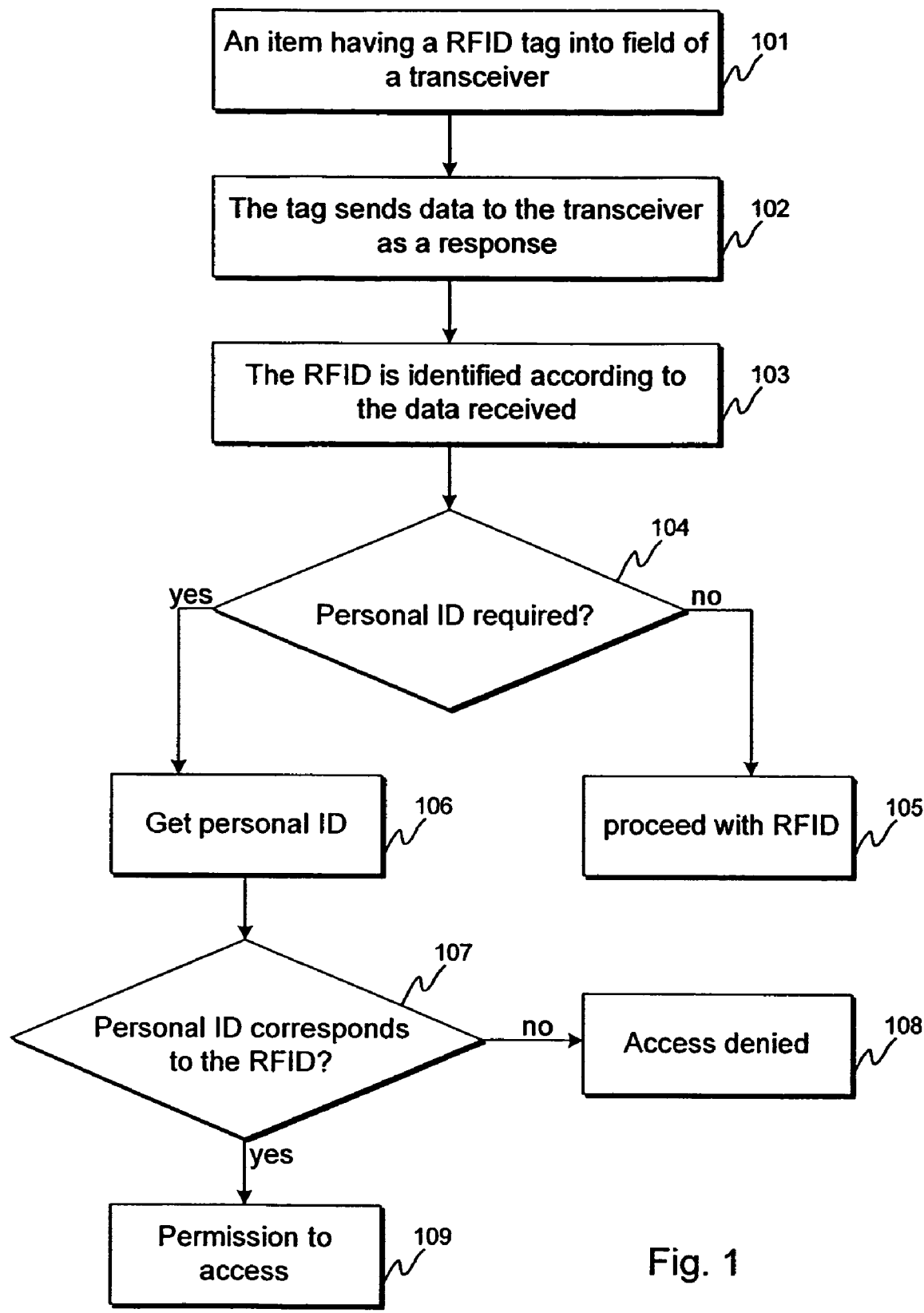
FIG. 1 illustrates a method according to an embodiment of the present invention.

FIG. 1 illustrates a method according to an embodiment of the present invention. Typically there is a transceiver for making RFID security checks for a certain area. The secured area can be for example premises of an employer, i.e. a factory area, premises of a company or any industrial premises. The transceiver transmits a signal. In a phase or step 101 an item having a RFID tag comes into RF field of the transceiver. RF field formed by the transceiver charges the RFID tag. When the RFID tag has enough power, it responds to the transceiver, as is presented in phase 102. The RFID tag sends data to the transceiver as a response. In phase 103 the RFID tag currently in the RF field of the transceiver is identified. The received data sent by the RFID tag is typically used for this identification for a certain RFID tag.

According to an embodiment, the RFID tag is identified in phase 103 so that the transceiver making the security checks looks up identifiers from a certain database or a like storage structure, including identifiers. Some data can be related to the stored identifiers. For example some identifiers can have certain accesses and permissions, and for some identifiers there can be associated further checks or requests to carry out and fulfil. According to an embodiment for some identifiers personal identification is required according to phase 104.

According to another embodiment the RFID tag is identified in phase 103 according to the data sent by the RFID tag in phase 102. According to the embodiment RFID tag includes a non-volatile storage. In the non-volatile storage of the RFID tag there is stored a bit or bits as a flag in order to indicate associated tasks or functions. The flag is also sent to the transceiver in phase 102. The transceiver checks bits of the received flag to determine tasks to be performed next. In this embodiment, there is no need to check the RFID against a database or a like storage means, but only flag bits need to be checked. Usually flag bits either allow certain function or deny it, or determine the task to set an alarm on or off. According to embodiments a task determined by the flag is to require a personal identifier according to phase 104.

In phase 104 there is checked whether a personal identifier is required. If the personal identifier is not required, the execution proceeds to phase 105 where the identified RFID is processed in the conventional way, e.g. by preventing its exit from secured premises. If a personal identifier is required in phase 104, it is obtained in phase 106. A personal identifier can be requested or read or remotely attained or obtained in any other suitable way. The personal identifier is checked in phase 107 in order for it to correspond to the RFID tag identified in phase 103. The correspondence of the RFID and personal identifiers can be checked by looking up a database storing identifiers or the identifiers can be associated to one another in any suitable way. If the RFID tag and personal identifiers do not correspond or have an association in between them, the access is denied according to phase 108. If in phase 107 the identifiers are found to correspond to each other, i.e. this identified tag belongs to this identified person, the originally requested access is permitted in phase 109.

According to an embodiment a user can control tags allocated for his use and attached to his personal items. The user may activate or deactivate a tag by setting certain bits.

The bits define the permission or denial for leaving the secured premises. The user controls and determines such permissions and denials by setting bits of the RFID tag. The bits are stored in the writable memory of the tag. An RFID reader checks the bits from the tag and determines according to the bits whether the tag has a permission to leave the secured premises or not. According to the embodiment no further equipment or means is required. The user may control bits of a tag with his personal equipment, such as a personal computer, a terminal, a mobile station or the like.

Figure 2:
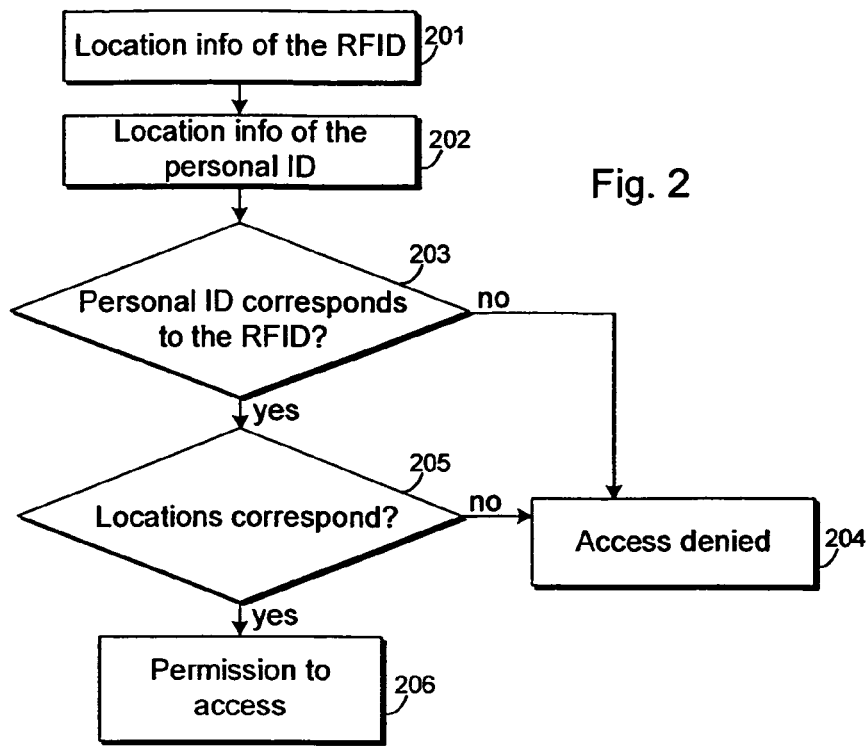
FIG. 2 illustrates a method according to another embodiment of the present invention.

FIG. 2 illustrates a method according to an embodiment of the present invention. According to the embodiment a RFID tag and a personal identifier are identified. In this embodiment the personal identifier is typically obtained through another means, i.e. not by the same means as the RFID tag is received and verified. The personal identifier is typically provided automatically, e.g. by activating some remote reader, which can get the users identity number from a badge or a like passage control identifier. According to the embodiment, location information of the identified RFID tag is checked, and if not present requested, in phase 201. Location information of the personal identifier is checked, and if not present requested, in phase 202. The location information can be sent with the data sent back to the transceiver as a response to receiving a signal by the RFID tag, or with a request for personal identifier or identifying a user. Alternatively, location information can be inquired later, after identifiers are identified. In this later phase, the identified identifiers are known to require also a location information and hence the location information is not transmitted for no reason.

In phase 203, it is checked whether the locations of the personal identifier and the RFID tag in question correspond with a certain accuracy with respect to each other. With this check it can be secured that these identifiers are detected within a certain area. With the location check it can be checked that the user, whose personal identifier is remotely read, carries the object having the identified RFID tag. The location check is advantageous, when both identifiers are remotely detected, especially if two different means for detecting the identifiers are used. If the locations do not correspond with a certain accuracy in phase 203, access is denied according to phase 204. If the detected location information of the personal identifier and the RFID correspond in phase 205, the requested access is permitted in phase 206. If the locations detected are found not to correspond, i.e. the locations are not inside certain area, or a distance between them is more than predetermined maximum, the requested access is denied according to phase 204.

Figure 3:
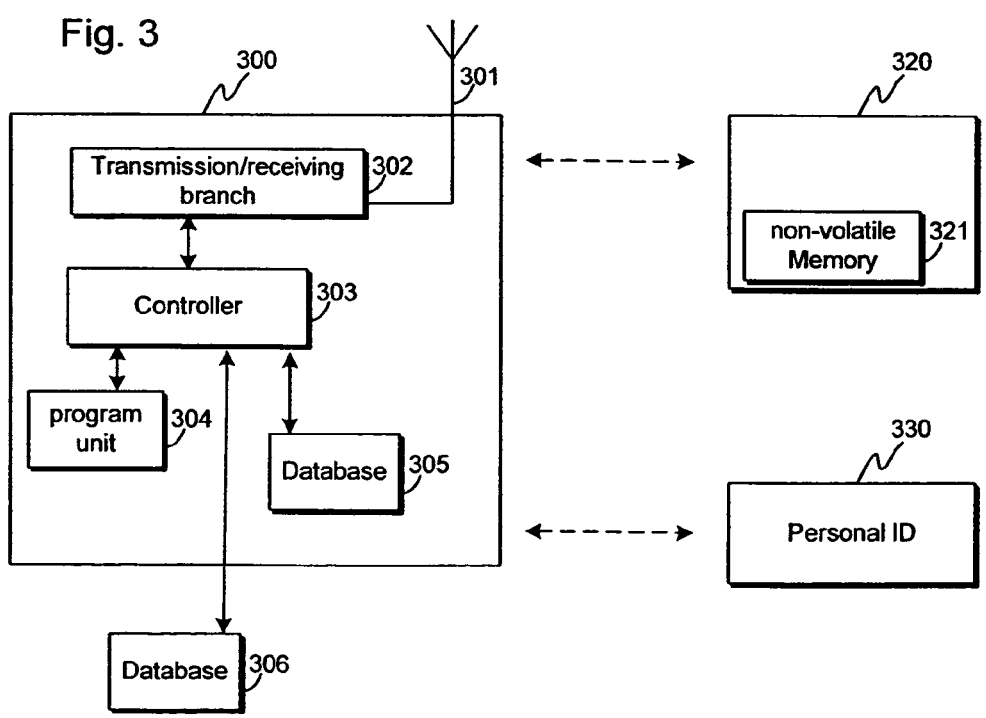
FIG. 3 illustrates an apparatus according to an embodiment of the present invention.

FIG. 3 illustrates equipment according to an embodiment of the present invention. A transceiver 300 includes an antenna 301 for transmitting signals in the form of radio waves. A transmission and receiving branch 302 includes means for amplifying signals and means for converting incoming signals from analog to digital form and outgoing signals from digital to analog form. A controller 303 manages and controls all blocks and functions of the transceiver 300. A program unit 304 includes executable code, program, commands or instructions for performing steps according to embodiments of the present invention. Further the transceiver 300 includes or has access to a database 305 including data relating to identifiers. For example RFID tag identifiers can be verified according to data included in the database 305. Further database 305 may include data relating to personal identifiers and associations between RFID identifiers and personal identifiers. According to an embodiment there is another database 306 in order to include personal identifiers. The database 306 is an external database to which the transceiver 300 and a control block 303 have an access. Users taking advantage of the RFID tags, e.g. employees, typically have access to at least one of the databases in order to associate tags allocated for them to their personal identifiers. Users may access and modify the database e.g. by a computer, a personal digital assistant (PDA), a mobile phone or by corresponding means of communication.

The RFID 320 according to embodiment is illustrated in FIG. 3. The RFID tag, sensing signals transmitted by a transceiver, is attached to a certain product or object. According to embodiment RFID tags are attached to objects during the manufacturing phase, i.e. RFID tags are already present in products when users get them. According to another embodiment certain RFID tags can be allocated to be used by a certain person and attached to certain personal products or objects owned by him. Typically personal objects secured using RFID technique are mobile players, such as CD players, headsets, radios, calculators, PDAs etc. The RFID tag is powered by the signals transmitted by a transceiver 300, and the RFID 320 send data back to the transceiver 300 as a response. The data sent back to the transceiver 300 may include bits representing a flag, which are stored in the non-volatile memory 321 of the RFID 320. When transceiver 300 receives such a flag, it can explore the flag with the aid of controller 303 and by the instructions of the program unit 304. According to an embodiment, where a flag is transmitted, there is no need to look up a database in order to explore the identification, permissions or acts to be performed next according to data received from RFID 320.

According to an embodiment the RFID tag reveals a need for identification of a person. Typically user may secure his own personal products by associating RFID tags allocated to him to his own personal identifier. Thus these both must be checked and match before a permission to leave the certain premises, e.g. premises of an employer, can be granted. Thus according to an embodiment, personal identifier 330 is required for a permission. A transceiver 300 includes means for indicating the need for personal identifier. According to an embodiment a transceiver 300 has means for requesting a personal identifier. User may input the identifier manually via keyboard or by inserting e.g. magnetic stripe, smart card, contactless card, optical card or the like to a reader. According to another embodiment a transceiver has means for accessing personal identifying badge or mark remotely. This can be implemented such that a transceiver 300 has means, e.g. a remote reader, for accessing user's personal identifier. According to another embodiment a transceiver 300 has means for activating other means for getting user's personal identifier through those means. The other means are for example a passage control system.

The invention claimed is:

1. Apparatus, comprising
   a transceiver for
      sending a signal in order to form a radio frequency field around a tag fixable to an item within premises and chargeable by the radio frequency field; and
      reading a response signal from the tag including data identifying the item; and
   a controller for
      checking the data identifying the item to determine if a personal identifier check is required and, if no personal identifier checking is required, proceeding with access control by allowing or preventing exit of the item from the premises based on said data identifying the item but,
if a personal identifier check is required,
obtaining a personal identifier and
checking from a database storing personal identifiers if the obtained personal identifier is associated to the identified tag, and
allowing an identified item to leave the premises if the identified tag is associated to the obtained personal identifier.

2. Apparatus according to claim 1, wherein the tag is fixed to the item in a manufacturing phase.

3. Apparatus according to claim 1, comprising means for allocating the tag among tags controlled by an employer for use of a certain employee having a personal identifier.

4. Apparatus according to claim 1, comprising means for requesting the personal identifier from the user.

5. Apparatus according to claim 4, comprising an input device for inputting the personal identifier manually.

6. Apparatus according to claim 4, comprising an input device for inputting the personal identifier automatically through a reader.

7. Apparatus according to claim 1, comprising a reader for remotely reading the personal identifier.

8. Apparatus according to claim 1, wherein the transceiver has a reader for remotely reading the personal identifier.

9. Apparatus, comprising
a transceiver for sending a signal in order to form a radio frequency field around a tag fixable to an item within premises and chargeable by the radio frequency field during passage of said item off premises and for receiving back from said tag, in response to said signal, data identifying the tag fixed to the item, the tag having distinct permission bits to require a personal identifier to be associated to a user the tag is allocated to or not, for determining permission to leave the premises during said passage of the item off premises, and
a controller for checking the permission bits of the identified tag during said passage of the item off premises, and for determining according to the permission bits of the tag if the item is allowed to leave the premises, either by deciding, if so required, if the data identifying the tag corresponds to the personal identifier of the user or by deciding, if so required, simply if the data identifying the tag permits the item to leave the premises without requiring any correspondence to any personal identifier.

10. Apparatus, comprising
a transmitter for sending a signal within premises in order to form a radio frequency field around a radio frequency identification tag,
a receiver for receiving data from the radio frequency identification tag for identifying the tag,
a controller for checking said data to determine if a check for presence of a personal identifier is required, and, if not-required, proceeding with access control by allowing or preventing exit of the item from the premises without further checking, but if required,
checking from a database storing personal identifiers if a personal identifier is related to an identified tag and
allowing an identified item to leave the premises only if the item is associated to the personal identifier by the tag.

11. Apparatus according to claim 10, having a reader for remotely reading the personal identifier.

12. Apparatus according to claim 10, wherein said controller has access to an external database for storing identifiers and data associated to them.

13. Apparatus according to claim 10, having a memory for storing identifiers and data associated to them.

14. Method, comprising
sending a signal by a transceiver within premises in order to form a radio frequency field,
receiving data in the transceiver from a tag fixable to an item to be secured within the premises and chargeable by the radio frequency field formed by the transceiver,
identifying the tag by the data sent from the tag as a response to the tag arriving in a coverage area of the radio frequency field,
checking said data to determine if a check for presence of a personal identifier is required, and if not required, proceeding with access control by allowing or preventing exit of the item from the premises without further checking, but if present,
checking from a database storing personal identifiers if a personal identifier is related to the identified tag, and
after a found association, allowing the item to leave premises secured by the security system but otherwise preventing the item from leaving the premises.

15. Method comprising
checking by charging a radio frequency identification tag with a surrounding field within secured premises, said checking for identifying an item passing out of the secured premises,
checking during the passage out of the secured premises either if only the item itself or also a personal identifier is required for identifying a particular person passing out with the item identified from a database storing personal identifiers associated to corresponding items,
based on said checking, determining during the passage out of the secured premises either if the item itself is allowed passage out of the premises without requiring any association to any personal identifier or if the item is allowed passage out of the premises only associated with the personal identifier, and
allowing the passage out of the secured premises either with or without finding an association depending on whether a determination of a personal identifier is required or not.

16. Method comprising
allowing or preventing exit of an item from secured premises either with or without also checking a personal identifier by charging a radio frequency identification tag with a surrounding field within secured premises, and checking data on said tag to determine if a personal identifier must be associated to said item or not before passing out of the secured premises, and
during said passing out of the secured premises, determining either if the item itself is allowed passage out of the premises without requiring any association to any personal identifier or if the item is allowed passage out of the premises only associated with the personal identifier.

17. Method, comprising
identifying a tag fixed to an item during passage out of secured premises so that data is received by a transceiver from the tag fixed to the item as a response to the tag arriving in coverage area of, and thus charged by, a radio frequency field formed by the transceiver,
determining if a personal identifier is required in association with said item and if not proceeding with control of said passage without identifying any person but if a personal identifier is required, identifying a person detected during said passage out of the secured premises by carrying the personal item in question by a personal identifier of a personal identifying system, checking according to the identified tag and personal identifier, if the identified tag associated to the personal identifier, and according to a possibly found association, is allowed to leave the secured premises.

18. Method comprising, during passage of an item off premises, identifying a tag fixed to the item so that data received by a transceiver of a security system from the tag fixed to the item as a response to the tag arriving in a coverage area of, and thus charged by, a radio frequency field formed by the transceiver, and checking according to permission bits of the tag, if the identified tag is allowed to leave the premises with or without also checking if a personal identifier is associated to said item.

19. System, comprising:

means for identifying a tag fixed to a personal item during passage out of secured premises such that data received by a transceiver of a security system from the tag fixed to the personal item as a response to the tag arriving in a coverage area of, and thus charged by, a radio frequency field formed by the transceiver; and means for checking during said passage out of the secured premises according to permission bits of the tag with or without also checking if a personal identifier is associated to said item if the identified tag is allowed to leave the secured premises.

20. The apparatus of claim 5, wherein said transceiver is located within a certain area of the premises and wherein said checking for the presence of a personal identifier is by checking whether a badge or like passage control identifier is also located within said area of the premises.

21. The apparatus of claim 6, wherein said transceiver is located within a certain area of the premises and wherein said checking for the presence of a personal identifier is by checking whether a badge or like passage control identifier is also located within said area of the premises.

22. The apparatus of claim 1, wherein said transceiver is located within a certain area of the premises and wherein said checking for the presence of a personal identifier is by checking whether a badge or like passage control identifier is also located within said area of the premises.

* * * * *